June 7, 1966     L. COHEN ETAL     3,254,591

ELECTRIC BROILER AND ROTISSERIE

Filed Nov. 27, 1964     3 Sheets-Sheet 1

INVENTORS
LOU COHEN
IRVING R. BELINKOFF
BY
Friedman & Goodman
ATTORNEYS

June 7, 1966 L. COHEN ETAL 3,254,591

ELECTRIC BROILER AND ROTISSERIE

Filed Nov. 27, 1964 3 Sheets-Sheet 2

INVENTORS
LOU COHEN
IRVING R. BELINKOFF
BY
Friedman & Goodman
ATTORNEYS

June 7, 1966  L. COHEN ETAL  3,254,591
ELECTRIC BROILER AND ROTISSERIE
Filed Nov. 27, 1964  3 Sheets-Sheet 3

INVENTORS
LOU COHEN
IRVING R. BELINKOFF
BY
Friedman & Goodman
ATTORNEYS

United States Patent Office  3,254,591
Patented June 7, 1966

3,254,591
ELECTRIC BROILER AND ROTISSERIE
Lou Cohen and Irving R. Belinkoff, Brooklyn, N.Y., assignors to Riviera Appliance Corp., Brooklyn, N.Y., a corporation of New York
Filed Nov. 27, 1964, Ser. No. 414,256
1 Claim. (Cl. 99—421)

The present invention relates in general to electrical cooking appliances and in particular to an electric broiler and rotisserie.

It is an object of the present invention to provide an electrical cooking appliance for broiling and roasting meats and poultry which will provide the food cooked thereon with substantially the same flavor provided such meat and fowl by outdoor broiling or roasting.

It is another object of the present invention to provide a food cooking appliance of the described type that doesn't require a hood or a shield to protect the walls of the kitchen or the like from smoke or spatter.

It is another object of the present invention to provide a highly novel arrangement for adjusting the spacing between the rotisserie and the heating element so as to adjust the cooking appliance for different size fowl or roasts or to provide a desired spacing between the cooking element and the fowl or roast so as to control the time involved in the cooking operation.

Other and further objects and advantages of the present invention will be readily apparent to one skilled in the art from a consideration of the following specification taken in connection with the appended drawings.

In the drawings which illustrate the best mode presently contemplated for carrying out the invention:

Figure 5:
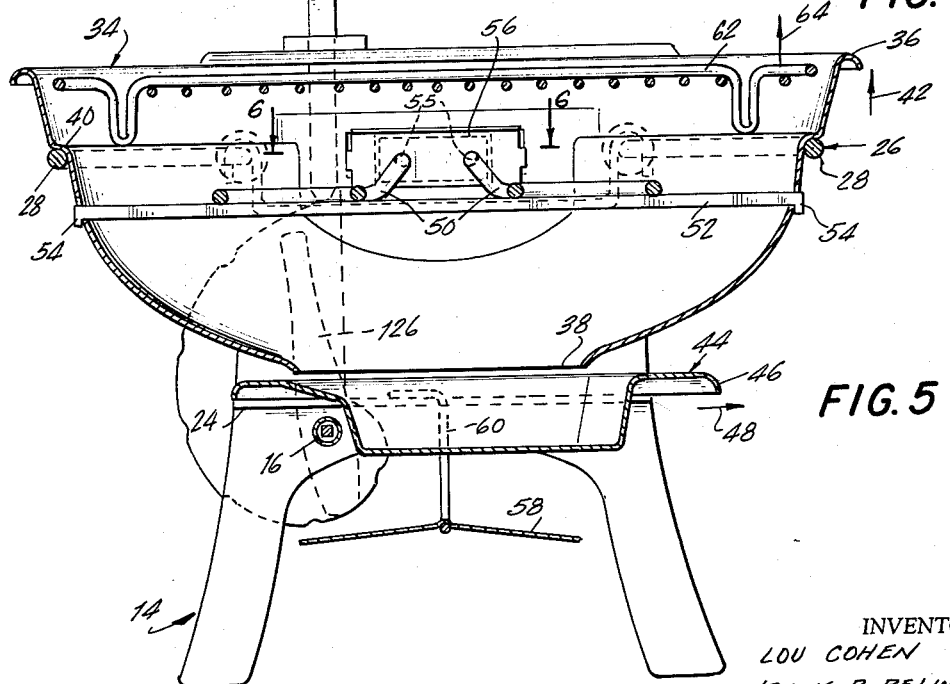
FIGURE 5 is a cross-sectional view on an enlarged scale taken on the lines 5—5 of FIG. 4.

Referring now to the drawings in detail, there is shown an electric broiler and rotisserie generally indicated by the reference numeral 10 pursuant to the present invention. The appliance 10 is provided with a supporting frame which is generally indicated by the reference numeral 12. The supporting frame 12 comprises a pair of laterally spaced ends supports 14—14 which are interconnected by a tube 16. Each end support 14 comprises a pair of spaced legs 18—18, a handle 20 and an opening 22 defined between the legs and the handle. On the inner surface thereof each end support 14 is provided with a ledge 24 as best shown in FIG. 5.

In addition to the supporting frame 12, the appliance 10 is also provided with a reflector mounting frame 26. The reflector mounting frame 26 comprises a pair of arcuate wire members 28—28 each of which is provided at each end thereof with a roller 30. At one end thereof the wire members 28 are interconnected by a wire interconnector 32 which retains the wire members in rigid spaced apart relation. It will be noted that the rollers are engaged in the opening 22 of the end supports 14 below the handle 20 thereof and due to the fact that the opening 22 extends upwardly from a minimum widthwise dimension thereof above the legs 18 to a maximum widthwise dimension thereof at the handle 20, it will be understood that the rollers can be tilted within the opening for inserting and removing the reflector mounting frame 26 from the supporting frame 12.

Figure 4:
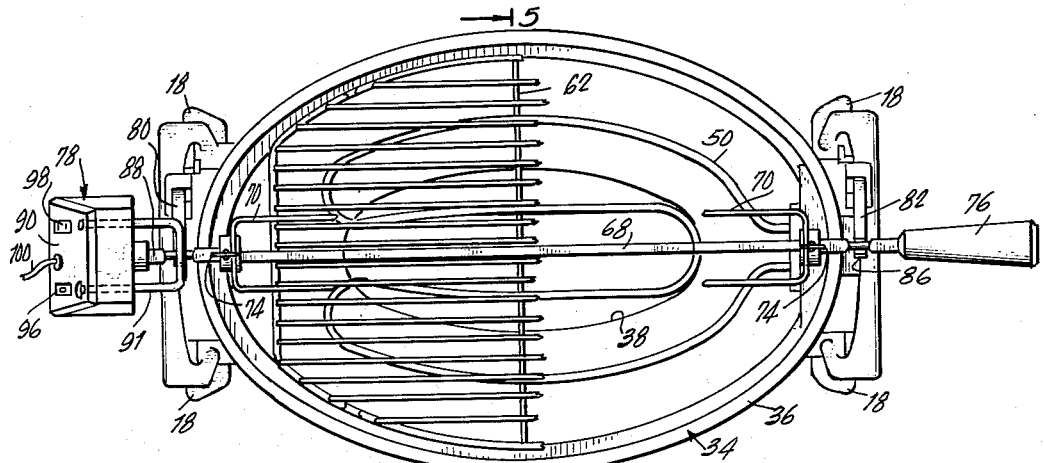
FIG. 4 is a top plan view.

The reflector mounting frame 26 removably mounts a metallic heat reflector 34. The heat reflector 34 is a disk shaped member provided with a curled upper rim 36 and having a bottom opening 38 as best seen in FIG. 4. Adjacent its upper rim 36 the reflector 34 is provided with a shoulder or ledge 40 as best shown in FIG. 5. The reflector 34 is removably mounted within its supporting or mounting frame 26 by merely seating the reflector within the wire frame 26 so that the shoulder 40 is engaged by the wire frame members 28 as illustrated in FIG. 5. In order to remove the reflector from the frame, the reflector need only be moved upwardly as shown by the arrow 42 in FIG. 5.

Figure 1:
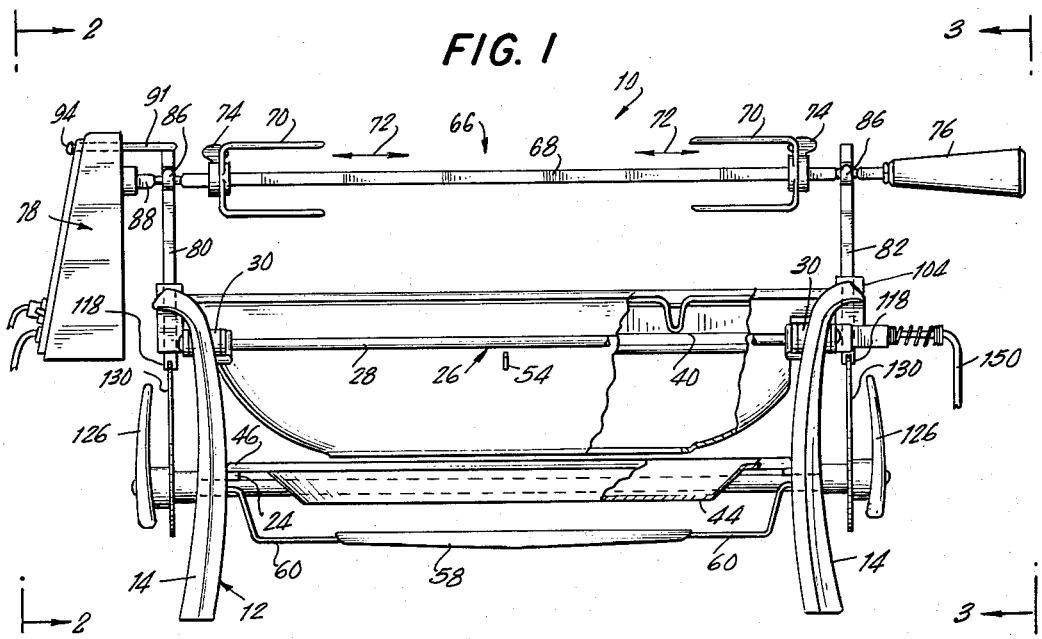
FIGURE 1 is a side elevation view of an electric broiler and rotisserie pursuant to the present invention.

Provision is also made for a drip pan 44 to be mounted below the opening 38 in the reflector 34. As best shown in FIG. 1, the drip pan extends between the end supports 14 of the supporting frame 12, the drip pan being provided with a ring 46 which seats on the previously mentioned ledges 24 provided on the inner surfaces of the end supports 14. The drip pan can be readily removed from the supporting frame 12 by withdrawing the drip pan from the supporting frame in the direction of the arrow 48 shown in FIG. 5 in a direction outwardly or laterally from the tube 16 which, as shown in FIG. 5, extends along one side of the drip pan when the latter is positioned in the frame 12. It will be understood that the drip pan may be readily inserted into position on the frame 12 by moving the drip pan into engagement on the ledges 24 in the direction opposite the arrow 48.

Figure 6:
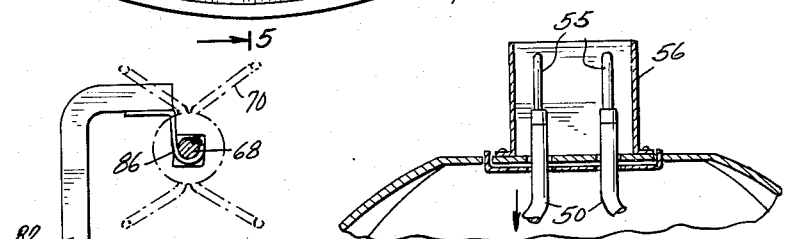
FIGURE 6 is a fragmentary detail view taken on the line 6—6 of FIG. 5.

The heating reflector 34 mounts an electric heating coil 50. For this purpose, the reflector is provided with a supporting strut 52 mounted in opposing portions of the reflector as at 54—54 in FIG. 5. The coil 50 rests on the strut and has a pair of end terminals 55—55, as best shown in FIG. 6, which extend into an outlet receptacle 56 provided on the reflector 34. As best shown in FIG. 4 the heating coil 50 is of the double loop type. The appliance 10 is provided also with a heat shield 58. As best shown in FIGS. 1, 2, 3 and 5, the heat shield is positioned to underlie the drip pan 44 so that when the latter is removed, the heat which passes through the opening 38 in the bottom of the heat reflector 34, will be deflected up toward the reflector and as a result serve to protect the surface upon which the appliance 10 is mounted. For this purpose, the heat shield 58 is provided with a pair of end hooks 60 which mount on the opposing ledges 24 as best shown in FIG. 5.

Figure 10:
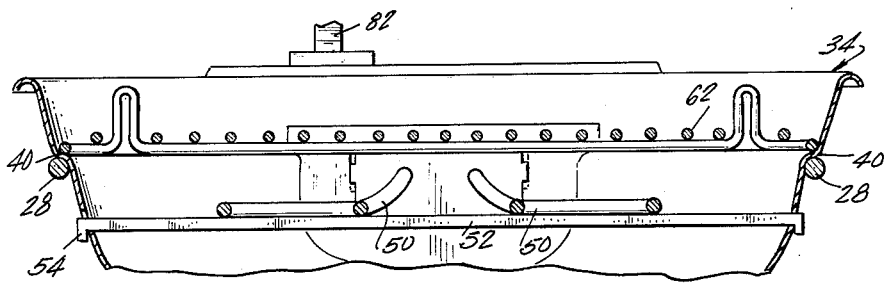
FIGURE 10 is a fragmentary view similar to FIG. 5 and illustrates the broiler grate reversed by 180° from the position thereof shown in FIG. 5.

For use as a broiler, the appliance 10 is provided with a wire grate 62. The grate mounts on the ledge or shoulder 40 of reflector 34 within the interior of the reflector. The grate can be mounted either in the position thereof shown in FIG. 5 or in the position thereof shown in FIG. 10. It will be noted that when mounted in the position thereof shown in FIG. 10, any food placed on the grate 62 will be closer to the heating element 50 than is the case when the grate is in a position thereof shown in FIG. 5 in which latter position the food is more distant from the heating coil. Consequently, for faster and more thorough cooking, the grate is placed in the position thereof shown in FIG. 10, and for slower or less intense cooking the grate is disposed in the position thereof shown in FIG. 5. In either case, the grate may be readily removed from the heat reflector by merely lifting the grate as indicated by the arrow 64 in FIG. 5.

As previously indicated, the appliance 10 is also adapted to serve as a rotisserie and for this purpose provision is made for a rotisserie device which is generally indicated by the reference numeral 66. The rotisserie 66 comprises a skewer 68 which is provided with a pair of adjustable meat holders 70. The holders may be adjustably positioned along the longitudinal extent of skewer 68 as indicated by the arrows 72 and releasably secured in the adjusted position thereof by means of the finger clamps 74. At one end thereof the skewer is provided with a handle or holder 76 and at the other end thereof the skewer is releasably engageable in an electric motor 78. More specifically, provision is made for a pair of laterally spaced skewer supports 80 and 82. Each support is provided with an L-shaped member having a hook 86 at the free end thereof. The skewer 68 is mounted in the spaced hooks 86 shown in FIG. 1 and is rotatable within such hooks when operated by the motor 78. More specifically, it will be understood that the end of skewer 68 opposite the handle 76 is directly releasably engageable with the motor 78 and is rotated thereby.

Figure 7:
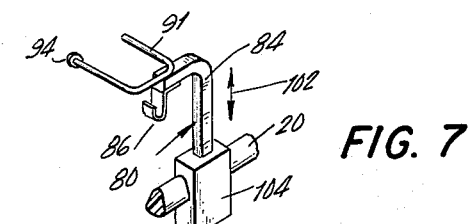
FIGURE 7 is a perspective view of the mechanism for adjusting the spacing between the rotisserie skewer and the heating element.

In order to releasably mount the motor 78 in position for rotating the skewer 68, the skewer support 80 is provided with a U-shaped member 91 as best shown in FIG. 7. For this purpose, the motor 78 is provided with a housing 90 having a pair of laterally spaced apertures 92 through which the opposed arms of the U-shaped member 91 extend. Provision is made for a removable cap 94 on one of said arms to prevent inadvertent disengagement of the motor housing therefrom. The motor housing 90 is provided also with a switch 96 and with an electric outlet receptacle 98. In addition, provision is made for an electric cord 100 by means of which the motor may be energized.

Figure 8:
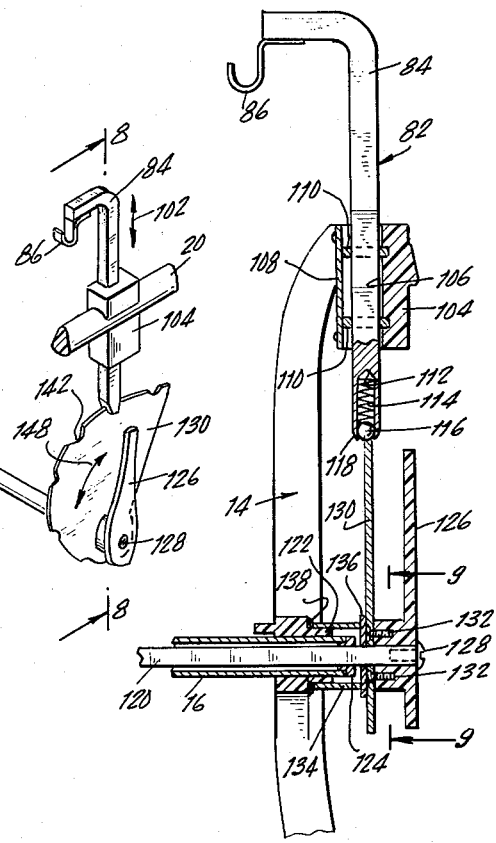
FIGURE 8 is a sectional view on an enlarged scale taken on the line 8—8 of FIG. 7.
Figure 9:
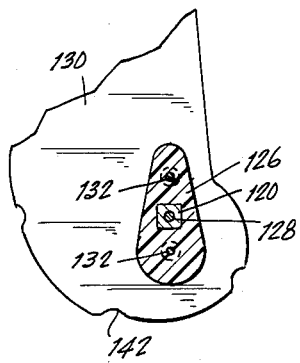
FIGURE 9 is a fragmentary sectional view taken on the line 9—9 of FIG. 8.

Pursuant to a highly novel aspect of the present invention, the rotisserie 66 and more specifically the skewer 68 may be vertically adjusted, as indicated by the arrows 102 in FIG. 7 relative to the heating coil 50 for the dual purposes of accommodating meats or fowl of different size to assure that the spacing between the skewer 68 and the heating coil or the reflector 34 will be able to accommodate a particular size roast or fowl and in addition for the purpose of subjecting the meat or fowl to desired specific temperatures by moving the meat or fowl closer or farther away from the source of heat, namely the heating coil. For this purpose, each handle 20 on each end support 14 is provided with a guide member 104 in which there is defined a longitudinal guideway or slideway 106. The L-shaped member 84 of the associated skewer support is mounted for vertical reciprocation in the associated guideway 106, provision being made to close the open side of each guideway by means of a cover plate 108 which is suitably secured thereto as by means of the screw or bolt 110. At its lower end, each member 84 is provided with an open ended recess 112 in which there is seated a coil spring 114 which urges a ball bearing 116 as best shown in FIG. 8. It will be noted that the lower end of the member 84 is cupped as at 118 so as to prevent the outward displacement of the ball bearing 116.

In order to effect the vertical adjustment of the L-shaped mounting members 84 for the skewer 68, provision is made for a rod 120 which extends through the previously mentioned tube 16. More specifically, each end of the tube 16 extends through a mounting portion 122 provided on the adjacent end support 14. Moreover, each end of the tube 16 is closed by a plug 124 through which the adjacent end of the rod or shaft 120 extends and with respect to which the rod is rotatable. At each end thereof the shaft 120 is provided with a handle 126 secured thereto as by means of a bolt 128. A cam 130 is secured as by means of the bolts 132 to the handle 126 for movement with the shaft 120. A tubular segment 134 is provided at one end thereof with a fiber clutch 136. The tubular segment is mounted on the extension 122 provided on each end support 14. More specifically, it will be noted that the rod 120 extends through the clutch 136 which is disposed between the cam 130 and the adjacent end of the tubular segment 134. The other end of the tubular segment 134 is biased by a spring washer 138 toward the cam 130. Consequently, it will be understood that the spring washer 138 is operative to bias the clutch 136 against the adjacent surface of the cam 130 so as to add resistance or friction to the movement of the cam and to prevent the cam from a fast movement or fast fall in the direction of the arrows 140 in FIGS. 2 and 3.

Figures 2, 3:
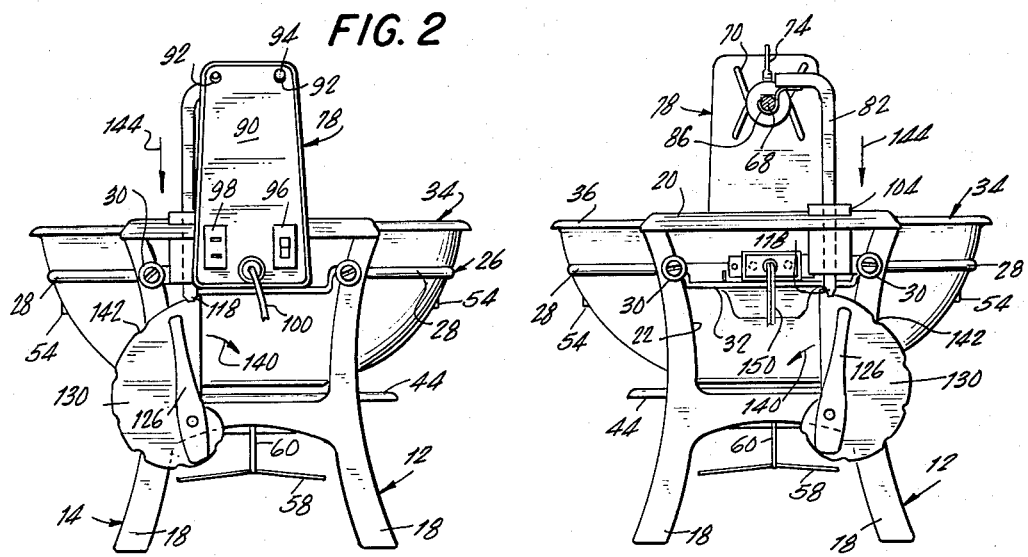
FIGURE 2 is an end view on a reduced scale taken in the direction of the arrows 2—2 of FIG. 1.
FIGURE 3 is an end view on a reduced scale taken in the direction of the arrows 3—3 in FIG. 1.

More specifically, the rotisserie 66 and the skewer 68 are illustrated in the highest or most raised position thereof relative to the heating coil 50 in FIGS. 2 and 3. When it is desired to lower the rotisserie, the handles 126 are rotated in the direction of the arrows 140 whereby the ball 116 is pressed inwardly against the bias of the spring 114 so that the ball bearing 116 may be engaged in the next or further detent or recess 142 defined in the cam edge as may be desired. In this manner, the cam may be rotated in the direction of the arrows 140 from a maximum raised position of the skewer 60 to any lower adjusted skewer position depending upon which recess 142 is engaged by the associated ball bearing, the skewer 68 moving downwardly thereby in the direction of the arrow 144. The previously described clutch 136 which is spring biased into engagement with the associated cam surface prevents a precipitous downward movement of the cam and results in a slower controlled downward movement of the cam and more specifically of the rotisserie 66. Consequently it will be apparent that movement of the handles 126 causes rotary movement of the shaft 120 as indicated by the arrows 146 in FIG. 7, resulting in opposite rotary movements of the cam 130 as indicated by the arrows 148 in FIG. 7 to raise or lower the rotisserie 66 as may be desired. The rotisserie is releasably retained in each adjusted position thereof by the spring biased engagement of the ball bearings 116 in the associated cam recesses 142.

Figure 11:
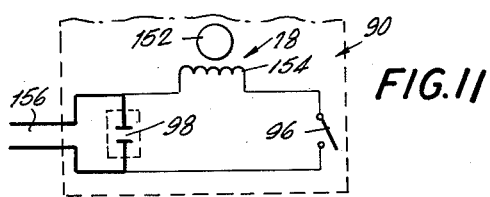
FIGURE 11 is a wiring diagram.

When operating the appliance 10 as a broiler, the electric cord 150 shown in FIG. 1 is interconnected between the receptacle 56 on the reflector 34 and a suitable electric outlet so as to energize the heating coil 50. In this case of course the meat is placed directly on the grate 62. When it is desired to operate the appliance 10 as a rotisserie, the skewer 68 is removed from the hooks 86 and passed through a roast or a fowl which is suitably clamped and held thereon by means of the adjustable holders 70 and the skewer is then replaced on the hooks 86 with the end 88 thereof engaged with the motor 78. The handles 126 are operated to provide the desired spacing between the skewer 68 and the heating coil 50. The motor energizing electric cord 100 is engaged in a suitable electric outlet and the end of the heater coil cord 150 remote from the receptacle 56 is engaged in the electric outlet 98 provided in the motor housing 90. The switch 96 is then operated so as to energize both the heating coil 50 and the motor 70. A wiring diagram is illustrated in FIG. 11. As here shown the electric motor 78 comprises a rotor 152 and a field coil 154. One end of the field coil is connected to one end of an electric power line 156. The other end of the field coil is connected to one terminal of the switch 96, the other terminal of which is connected to the other end of the power line 156. The electric outlet 98 is connected across the line 156. Consequently it will be apparent that the heater coil 50 is energized when connected to the electrical outlet 98 and that the motor 78 is energized when switch 96 is closed.

In view of the foregoing it will be apparent that there has been illustrated and described a highly novel electric appliance which can operate both as a broiler and a rotisserie and which has provision for adjusting the rotisserie relative to the heating element of the broiler for controlling the cooking temperature and cooking time as well as for making provision to accommodate different size roasts and fowls. It will be understood that various changes and modifications may be made therein without, however, departing from the inventive concept thereof, as set forth in the appended claim.

We claim:

In an electric cooking appliance having a heat reflector provided with a top opening and a bottom opening, a drip pan mounted below said bottom opening, a heating coil mounted between said openings, and means to mount a motorized skewer for rotation above said top opening, means to adjustably position said skewer mounting means relative to said coil to adjust the spacing between the skewer and said coil, said skewer mounting means comprising a pair of laterally spaced skewer holders, one of said holders having provision to mount an electric motor for rotating the skewer, and manually operable cam means engaged with said holders for raising and lowering said skewer holders, said cam means comprising a pair of cam segments, a shaft interconnecting said cam segments, and a handle provided on each end of said shaft, each of said holders having an outwardly biased anti-friction means which is engaged with an associated cam segment.

References Cited by the Examiner

UNITED STATES PATENTS

| | | | |
|---|---|---|---|
| 2,214,060 | 9/1940 | McCormick | 99—446 |
| 2,505,976 | 5/1950 | Leon | 99—421 |
| 2,812,706 | 11/1957 | Del Francia et al. | 99—446 |
| 2,845,856 | 8/1958 | Sack | 99—421 |
| 2,903,549 | 9/1959 | Joseph | 99—446 X |
| 3,163,103 | 12/1964 | Shoup | 99—340 X |
| 3,174,863 | 3/1965 | Shoup | 99—446 X |

FOREIGN PATENTS 217,527   5/1907   Germany.

WALTER A. SCHEEL, *Primary Examiner.*

STANLEY P. FISHER, *Assistant Examiner.*